Sept. 5, 1967 G. M. FULMER ETAL 3,339,766
PALLET LIFTING AND TRANSPORTING DEVICE
Original Filed Dec. 31, 1962 2 Sheets-Sheet 1
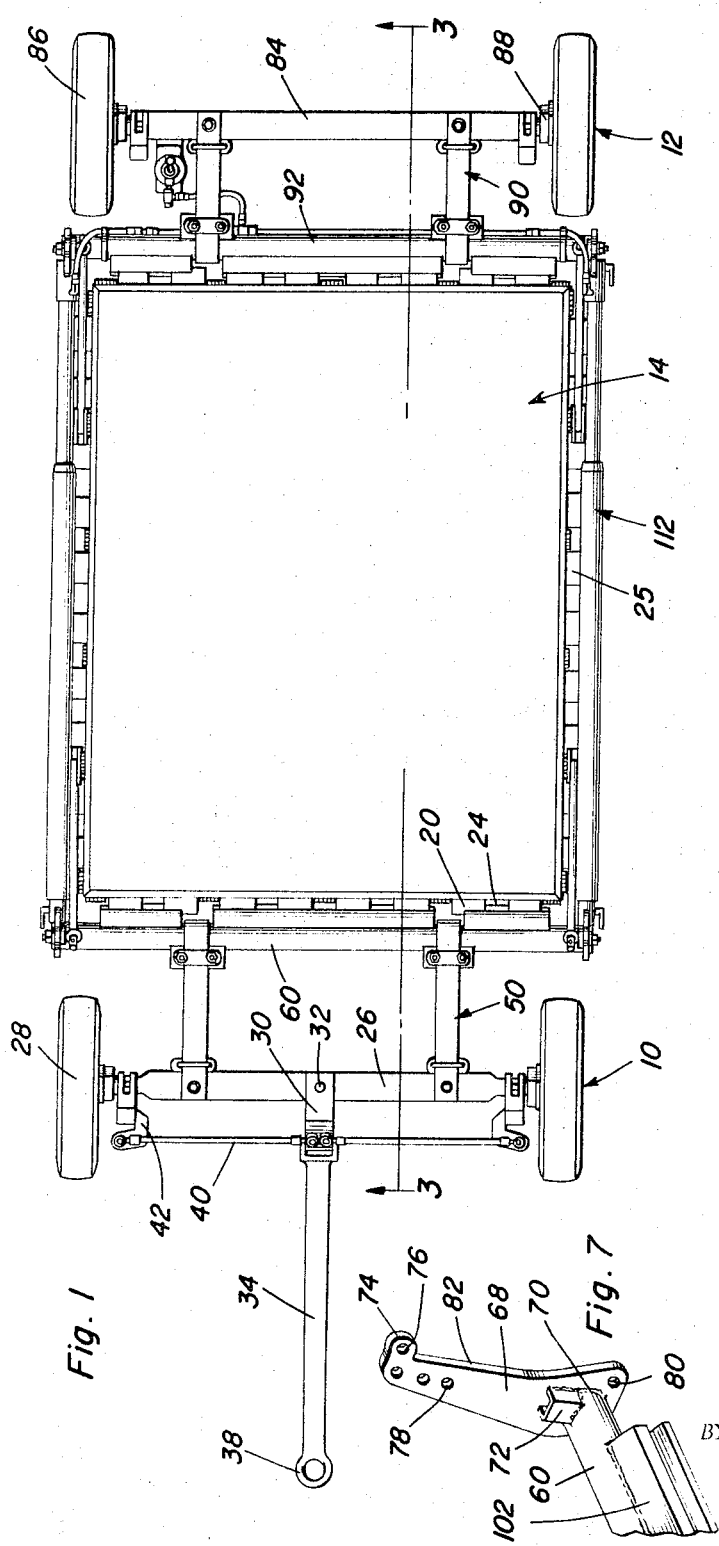
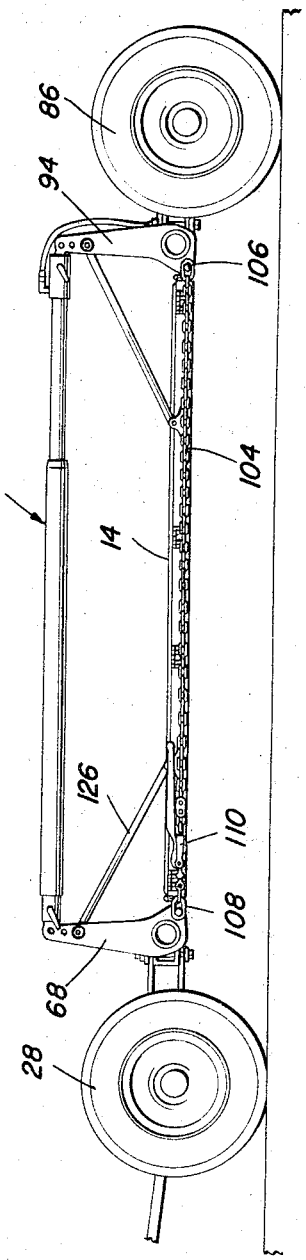
George M. Fulmer
Kirwan Y. Messick
INVENTORS.

Sept. 5, 1967   G. M. FULMER ET AL   3,339,766
PALLET LIFTING AND TRANSPORTING DEVICE
Original Filed Dec. 31, 1962   2 Sheets-Sheet 2
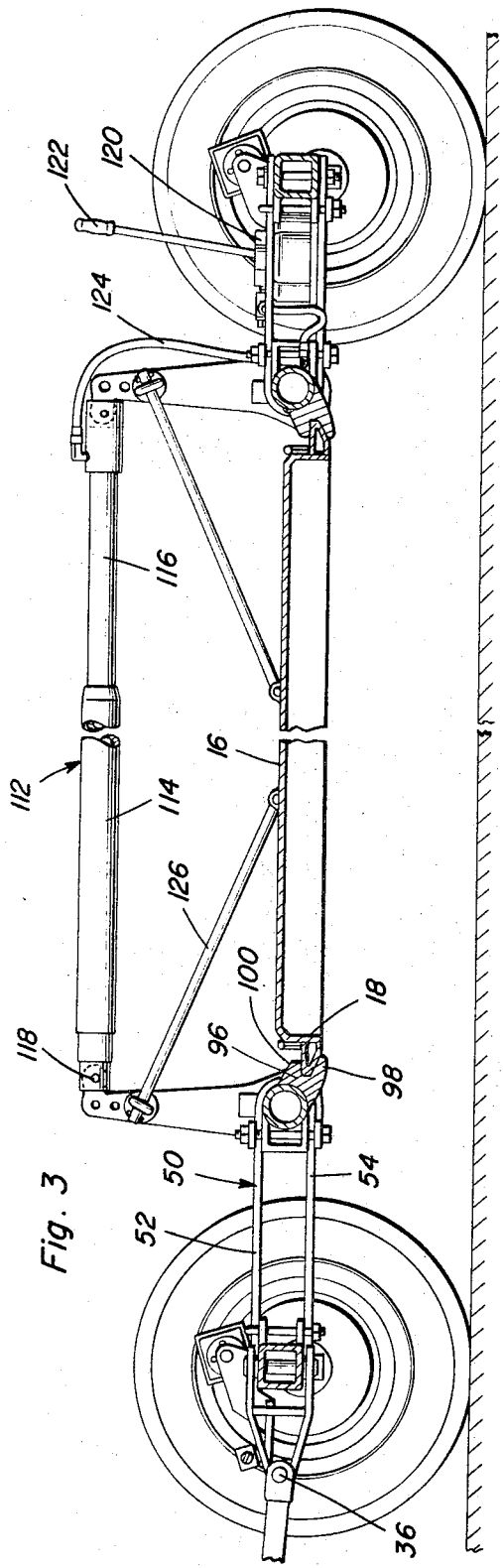
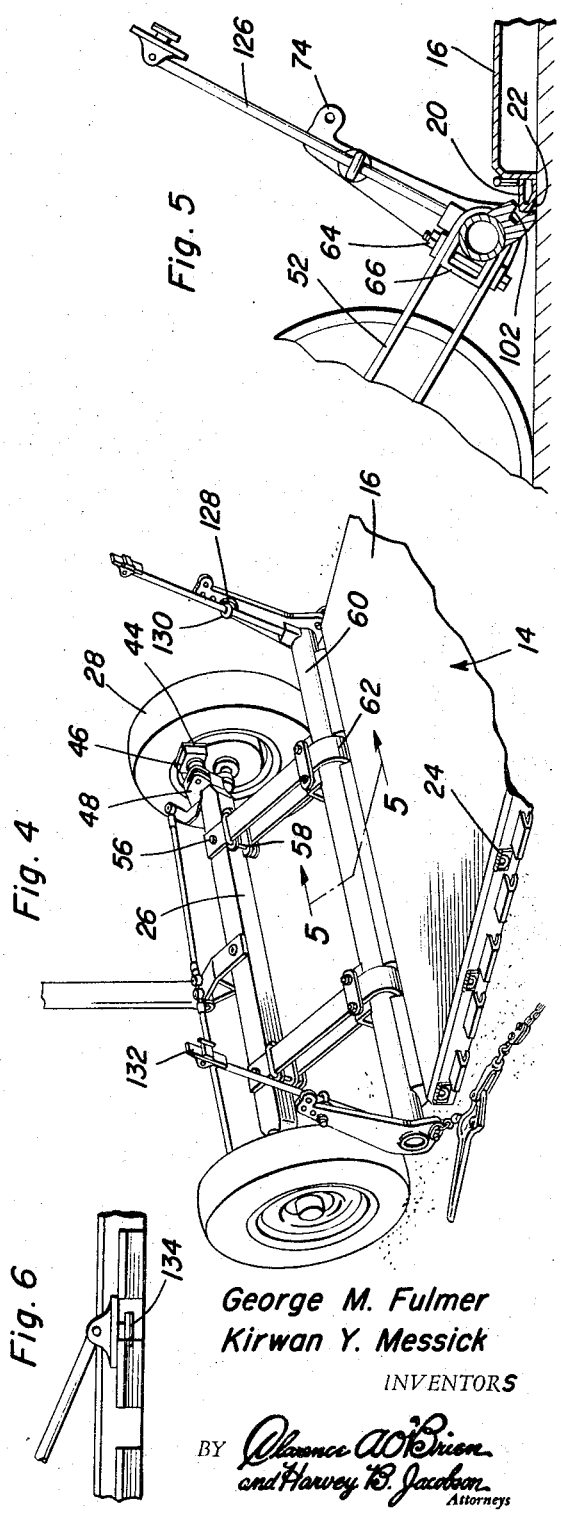
George M. Fulmer
Kirwan Y. Messick
INVENTORS

United States Patent Office 3,339,766
Patented Sept. 5, 1967

3,339,766
PALLET LIFTING AND TRANSPORTING
DEVICE
George M. Fulmer, Silver Spring, Md., and Kirwan Y.
Messick, Falls Church, Va., assignors, by mesne assignments, to Gichner Mobile Systems, Inc., a corporation
of Maryland
Continuation of application Ser. No. 248,444, Dec.
31, 1962. This application Sept. 8, 1965, Ser. No.
490,765
13 Claims. (Cl. 214—394)

This application is a continuation of our copending application Ser. No. 248,444, filed Dec. 31, 1962, for Pallet Lifting and Transporting Device.

The present invention generally relates to an assembly for lifting a pallet from a position at rest on the floor or ground surface, maintaining the pallet in an elevated position and providing a running gear for such a pallet so that it may be easily transported to a desired location at which point the pallet may be lowered to the floor or ground surface and the lifting and transporting device of the present invention removed or disconnected from the pallet.

An object of the present invention is to provide an assembly that is totally self-contained and capable of engaging opposite ends of a pallet which is resting on a supporting surface such as the ground surface, lifting the pallet and any load which may be on the pallet to an elevated position, maintaining the pallet in an elevated position and facilitating transport of the pallet over various types of terrain after which the pallet may be lowered and the assembly completely disconnected and easily transported back to any other desired location for use with other pallets.

Essentially, the present invention involves two wheeled units with each unit having an axle and a pair of laterally spaced wheels thereon and a rigid transverse beam located in spaced parallel relation to the axle of the wheeled assemblies. The transverse beam includes upstanding arms at each end thereof and projections thereon for engaging the forward and rear end edges of a pallet. The ends of the transverse beam are interconnected by a tension member such as a chain or cable thus fixing the distance between the beams. An expansible unit is then interconnected between the upper ends of the arms at each end of the beams so that the arms are pivoted in a manner that the upper ends thereof will swing apart thus causing the wheeled assemblies to pivot about an axis generally defined by the axles of the assemblies thereby causing the pallet which has been engaged at the forward and rear ends by the projections on the beam to be elevated to a point where the tension member interconnecting the ends of the beams and the expansion elements interconnecting the upper ends of the arms are substantially parallel. A suitable brace mechanism may then be provided for retaining the arms in their vertical position during transport thus eliminating the necessity of retaining the arms in their generally vertical position by the expansion mechanism.

Accordingly, it is another object of the present invention to provide a pallet lifting and transporting device in accordance with the preceding paragraph which is relatively simple in construction, rugged and long lasting, capable of use with various types of pallets and load carrying platforms, easy to assemble and disassemble and generally inexpensive to manufacture and maintain.

Yet another important feature of the present invention is the provision of a pallet lifting and transporting device which is especially adapted for use with that type of pallet employed in conjunction with cargo carrying aircraft which will enable the pallet to be readily and expeditiously transported from or to a plane and an area remote therefrom even though the terrain which must be traversed is not paved.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the present invention associated with a pallet;

FIGURE 2 is a side elevational view of the construction of FIGURE 1 illustrating the relationships of the components to each other and to the pallet;

FIGURE 3 is a longitudinal, vertical sectional view, on an enlarged scale, taken substantially upon a plane passing along section line 3—3 of FIGURE 1 illustrating further structural details of the invention and the relationship of the transverse beams and the projections thereon to the pallet;

FIGURE 4 is a partial perspective view illustrating the manner in which the front wheeled assembly is associated with the pallet prior to elevation thereof;

FIGURE 5 is a detail sectional view taken substantially upon a plane passing along section line 5—5 of FIGURE 4 illustrating the relationship of the projection on the transverse beam to the end portion of the pallet prior to the pallet being lifted;

FIGURE 6 is a fragmental side elevational view illustrating the manner in which the brace is attached to the side edge of the pallet; and FIGURE 7 is a fragmental perspective view of one end portion of the transverse beam illustrating the upstanding arm thereon and the projection attached thereto.

Referring now specifically to the drawings, the numeral 10 generally designates a front wheeled assembly and the numeral 12 generally designates a rear wheeled assembly for association with a pallet generally designated by numeral 14 for the purpose of forming a device for lifting and transporting the pallet 14.

The pallet 14 includes a top load-carrying panel 16 having depending forward and rear flanges 18. Projecting from the depending forward and rear flanges 18 is a plurality of projections 20 each of which have a substantially flat or horizontal top surface and a bottom surface which has an upwardly curved outer portion designated by numeral 22 as illustrated in FIGURE 5. In between the projections 20 is a plurality of loops 24 by which tie-downs may be attached or swing cables or the like may be attached to facilitate handling of the pallet. The side edges of the pallet 14 are also provided with projecting flanges 25 which are spaced from each other and as illustrated in FIGURE 4, the loops 24 are pivotally attached to the pallet 14.

The pallet structure itself does not form part of the present invention except in its relationship to the forward and rear wheeled assemblies 10 and 12. The pallet structure may vary and in this event, the particular structure of the present invention which engages and is associated with the pallet may be varied accordingly to cooperate with other pallet structures for operation in the same manner as specifically disclosed herein.

The front wheel assembly 10 includes a transversely extending axle 26 having steerable wheels 28 mounted on each end thereof for pivotal movement about an axis perpendicular thereto which is disposed substantially in a vertical direction when the front wheel assembly is in its pallet transporting position thereby enabling the assembly to be steered.

A drawbar 30 projects forwardly from the axle 26 and is pivotally attached thereto by a pivot pin, bolt or the like 32. A forwardly extending tongue 34 is attached to the forward end of the drawbar in a manner which enables vertical swinging movement of the tongue 34 about a pivot pin 36 which defines a horizontal axis of swinging movement for the tongue 34. The forward end of the tongue 34 is provided with a loop 38 or other suitable means for attachment to a towing vehicle. Attached to the top surface of the drawbar 30 is a pair of drag links 40 which have their outer ends connected to steering arms 42 carried by the supporting plate for the wheels 28. The wheels 28, of course, rotate on a suitable spindle and the steering arms 42 are rigid in relation to the spindle for turning the spindle about a vertical axis of a king pin which secures the spindle and associated structure to the ends of the axle 26. There is also provided a plate 44 rigid with the wheel assembly having bonded thereto a block of rubber 46 to which is attached an arm 48 to the inner surface thereof whereby the block of rubber 46 serves as a resilient spring suspension for the wheel assemblies in relation to the axle thereby resisting movement of the wheel assembly in relation to the axle by employing the resistance to shear of the rubber block.

Extending rearwardly from the axle 26 which may be conveniently a tubular structural element is a pair of arms each generally designated by the numeral 50 and each of which includes a pair of parallel plates 52 and 54 which overlie and underlie respectively, the axle 26 and which are secured thereto by a suitable bolt or other fastener 56. A clamp assembly 58 is provided on the plates 52 and 54 immediately adjacent the axle 26.

The rear ends of the plates 52 and 54 are secured to a transverse beam 60 in the form of a cylindrical hollow member and the plates 52 and 54 are continuous around the transverse beam 50 by virtue of an interconnecting bight portion 62 as illustrated in FIGURE 4. A clamp bolt assembly 64 extends between the plates 52 and 54 and a channel-shaped saddle 66 is mounted on the clamp bolt assembly 64 so that it engages the periphery of the transverse member 60 in opposed relation to the bight portion 62 thereby rigidly affixing the transverse beam 60 to the rearwardly extending arms 50 so that the beam 60, arms 50 and the transverse axle 26 are all rigidly interconnected.

At each end of the beam 60, there is provided an upstanding arm 68 affixed thereto as by welding 70 or the like. A reinforcing channel 72 is welded to the inner surface of the arm 68 and to the adjacent surface of the beam 60. The upper end of each arm 68 is provided with a rearwardly extending lug 74 having an aperture 76 therein. Also, a plurality of vertically spaced apertures 78 are provided in the upper end portion of the arm 68 and these apertures are located forwardly of the aperture 76 in the lug 74. At the bottom rear corner of each arm 68, there is provided an aperture 80 and the rear edge of the arm 68, that is, the area extending between the aperture 80 and the lug 74 is curved forwardly as indicated by numeral 82 and may be said to be slightly concave.

The rear wheel assembly 12 is somewhat similar in construction to the front wheel assembly except that it does not have steerable wheels. Rather, it has a transverse rigid axle 84 having non-steerable wheel assemblies 86 on each end thereof which are also supported by a rubber block 88 in shear which provides a spring assembly for the wheel assemblies 86. Forwardly extending and rigidly attached to the axle 84 is a pair of arms 90 which are the same in construction as the arms 50 and attached to the axle 84 in the same manner in which the arms 50 are attached to the axle 26. Also, the rear wheel assembly includes a transverse beam 92 identical in construction to the beam 60 and the beam 92 is attached to the arms 90 in the same manner as the beam 60 is attached to the arms 50. Each end of the transverse beam 92 is provided with an upstanding arm 94 having the same apertured configuration employed in the arms 68 except that the lugs on the arms 94 faces forwardly while the lugs on the arms 68 face rearwardly.

As illustrated specifically in FIGURES 3–5 and also in FIGURE 7, the beam 60 as well as the beam 92 is provided with a lateral projection 96 extending throughout the longitudinal length of the respective beams except where the arms 50 and 90 respectively are attached thereto and except for the extreme outer end portion of the beam 60 and 92 respectively. Each projection 96 is provided with a lower projecting finger 98 which is slightly longer and spaced from an upper projecting finger 100 with the space between the fingers 98 and 100 being designated by numeral 102 and generally conforming in shape and configuration to the projection 20 on the forward and rear ends of the pallet 14. The top surface of the finger 98 is inclined to conform with the inclination of the inclined surface 22 on the projection 20 when engaged therewith as illustrated in FIGURE 3. Also, the bottom edge of the finger 98 is rounded or tapered so that it will form substantially a rounded pointed lower edge for engagement under the projection 20 in the manner illustrated in FIGURE 5 when the pallet is resting on the ground and the beam 60 is brought into alignment with the projection 20 and the recess 102 engaged with the leading edge of the projection 20 on the pallet 14. Thus, in assembling the wheel assemblies 10 and 12 with the pallet 14, the front wheel assembly is orientated as illustrated in FIGURES 4 and 5 and the rear wheel assembly is orientated in a comparable manner so that the recesses 102 are partially engaged with the projections 20 on the pallet 14.

After the front and rear wheel assemblies 10 and 12 have been orientated in this relationship, a flexible tension element 104 such as a chain, as illustrated, a cable or the like is connected to the lowermost apertures 80 in the arms 68 and 94 respectively by bolt 106 or any other suitable fastening means which extends through an end loop or adapter 108 on the flexible tensioning member. An over-center type take-up device 110 is interposed in the flexible tension member 104 for effectively shortening the length of the chain 104 or other tensioning member. The take-up device may be a conventional chain tightener of the over-center type as illustrated more clearly in FIGURE 4 so that the projections 96 may be brought into tight engagement with the projections 20 on the pallet 14 with the arms 68 and 94 still inclined towards the pallet 14 as illustrated in FIGURES 4 and 5.

After this condition has been reached, an expansion device generally designated by numeral 112 is disposed between the upper ends of the arms 68 and 94 respectively at either side of the pallet and the expansion device is in the form of a hydraulic cylinder 114 having a reciprocating piston therein designated at 116. The piston 116 may be hollow and actually form part of the expansion chamber with the sliding connection between the piston 116 and the cylinder 114 sealed in a conventional manner. The opposed ends of the expansion unit 112 have sockets receiving the lugs 74 and a pin 118 is provided for securing the ends of the expansion unit 112 to the lugs 74 on the arms 68 and 94 respectively.

With the pallet resting on a supporting surface and the front and rear assemblies orientated in relation thereto as illustrated in FIGURES 4 and 5 and with the chain or other tension member tensioned by the tightener 110, the expansion unit is contracted and connected to the upper ends of the arms 68 and 94 which are inclined toward each other and toward the center of the pallet. The expansible unit 112 is then expanded causing the arms 68 and 94 to be disposed parallel to each other as illustrated in FIGURE 3. Inasmuch as the lower end of the arms are engaged with the beam and the beam is engaged with the projections, the wheel assemblies 10 and 12 will pivot about an axis generally defined by the axles 26 and 84 respectively and will thus lift the pallet vertically upwardly to an elevated position so that the pallet is in substantial alignment with the arms 50 and 90 and the expansion unit 112 is substantially parallel to the tension member 104.

For expanding the expansion unit, there is provided a manually operated pump assembled 120 carried by a suitable bracket on the rear axle 84 and an operating handle 122 is provided together with a suitable control valve for supplying and exhausting hydraulic pressure to the expansion units through a suitable hose or tube connecting means 124. Thus, by operating the handle 122, fluid pressure is admitted to both of the expansion units for simultaneous expansion thereof for raising the pallet 14. When it is desired to lower the pallet 14, the control valve for the pump may be open to enable the fluid pressure to be exhausted back to a suitable reservoir therefor.

For locking the arms 68 and 94 in generally parallel relation so that the pallet 14 will be maintained in elevated condition, there is provided a pair of braces 126 having one end thereof connected to one of the apertures 78 by virtue of a fastener assembly 128 having a loop eye 130 on the inner end thereof slidably receiving the upper end of the brace 126. The other end of the brace 126 is provided with an adapted place 132 pivotally attached thereto and including a lug 134 for sliding inwardly between the flanges 25 on the side edges of the pallet thus locking the brace to the pallet and locking the brace to the arms for retaining the arms in position. When it is desired to disconnect the brace, it is only necessary to slide the adapter 132 outwardly and then slide the other end thereof, down through the loop eye 130 and bring the lowered end thereof into engagement with the socket defined by the channel-shaped reinforcing member 72 thereby retaining the braces in the stored position as illustrated in FIGURE 4. For locking the brace 126 to the ring or loop eye 130, the brace 126 is provided with a notch in the undersurface for receiving the bottom portion of ring 130 thereby locking the brace 126 to the ring 130 and enabling easy release of the brace from the ring by merely lifting up on the brace 126.

Thus, it will be readily apparent that the present invention provides two wheeled assemblies which are associated in a particular manner with a pallet structure and upon operation of an expansion device, the pallet will be lifted and be capable of being transported. When the pallet reaches its destination, the wheeled units may be easily removed bly reversing the assembly procedure and the two wheeled units may then be short coupled in any suitable manner for return to any desired location.

The foregoing is considered as illustrative only of the principles of the invention. Further, since numerous modifications and changes will readily occur to those skilled in the art, it is not desired to limit the invention to the exact construction an operation shown and described, and accordingly all suitable modifications and equivalents may be resorted to, falling within the scope of the invention as claimed.

What is claimed as new is as follows:

1. A device for lifting and transporting a load carrying pallet comprising a front wheeled assembly and a rear wheeled assembly, a transverse beam supported on the front wheeled assembly and being spaced rearwardly of the rotational axis of the wheels on the wheeled assembly, a transverse beam mounted on the rear wheeled assembly and being spaced forwardly of the rotational axis of the wheels on the rear wheeled assembly, each transverse beam having upstanding arms on the respective ends thereof, each beam including means engageable with the edges of a pallet disposed therebetween, a connecting member extending between the lower ends of the arms for retaining the means on the beam engaged with the pallet, and an expansible unit interconnecting the upper ends of the arms for urging the upper ends of the arms apart thus swinging the beams about the rotational axes of the wheels on the wheeled units and thereby elevating the pallet.

2. The structure as defined in claim 1 wherein said means engaging the pallet on each beam includes a pair of projecting parallel fingers spaced from each other and each extending along a major portion of the length of the beam.

3. The structure as defined in claim 1 wherein each of said wheeled assemblies includes a transverse axle, a pair of arms rigidly fixed to the axle and rigidly fixed to the beam thus spacing the beam from the axle.

4. The structure as defined in claim 1 wherein said member interconnecting the lower ends of the arms includes a flexible tension member, and a tightener incorporated into the tension member for shortening the effective length thereof for bringing the means on the beam into engagement with the ends of the pallet.

5. The structure as defined in claim 1 wherein said expansible unit includes a piston and cylinder assembly detachably connecting the upper ends of the arms.

6. The structure as defined in claim 1 together with detachable braces extending between the side edges of the pallet and the upper end portion of the arms when the arms are in upright position for retaining the pallet in elevated position without retaining pressure in the expansible unit.

7. The structure as defined in claim 1 wherein each wheeled assembly includes a transverse axle, a wheel unit at each end of each axle, and rubber in shear means interconnecting the axle and the wheel unit for suspending the wheel unit from the axle with the rubber in shear serving to cushion movement of the wheel unit in relation to the axle.

8. The combination as defined in claim 7 wherein the wheel units on the front wheeled assembly are steerable, a tongue extending from the center of the front wheeled unit and drag links connected thereto and to the front wheel units for steering the front wheel units.

9. In a device for lifting a load, a wheeled assembly including a transverse element having means thereon engageable with the load, said assembly including an upstanding arm connected with the assembly adjacent to its point of engagement with the load, and means connected to said arm for varying the angular position of said arm for varying the angular orientation of said assembly about a transverse axis for raising and lowering the point of engagement with the load thereby raising and lowering the load, said assembly including means for securing the load engaging means in engagement with the load during angular movement of the arm and angular movement of the assembly about a transverse axis, said wheeled assembly including a transverse axle, a wheel unit on each end of said axle, laterally extending arm means rigid with the axle and supporting the load engaging means at the end thereof remote from the axle whereby angular adjustment of the assembly about the transverse axle will cause vertical elevational movement of the means engaging the load, said means for adjusting the arm about a transverse axis including an expansible and contractible fluid pressure piston and cylinder assembly operatively connected to the upper end portion of said arm for swinging movement of the arm about a transverse axis.

10. The structure as defined in claim 9 wherein said means on said wheeled assembly engaging load includes a laterally projecting flange for engaging under a portion of said load, said means for retaining the means in engagement with the load including means for retaining said flange in engagement with the load with the point of application of such retaining force being closely adjacent the point of engagement of the flange with the load whereby the flange will be retained in engagement with the load during angular movement of the wheeled assembly about the transverse axle.

11. A device for lifting and transporting a load unit comprising a front wheeled assembly and a rear wheeled assembly, each wheeled assembly including a transverse axle having a wheel unit on each end thereof, arm means extending laterally from each of said axles and being substantially perpendicular thereto, each arm means including an upstanding arm at the free end thereof, means on the free end of each arm means for detachable engagement with the load unit, means operatively connected with the ends of the arm means remote from the axles retaining the arm means engaged with the load unit for enabling the arm means to raise and lower the load unit when the wheeled assemblies are pivoted about a transverse axis defined by the transverse axle, and expansible and contractible fluid pressure operated means connected with the upper ends of said upright arms for varying the angular position of the upright arms and thereby causing the wheeled assemblies to pivot about the transverse axles due to the point of engagement of the wheeled assemblies with the load unit being spaced from the point of application of force on the upright arms.

12. In a device for lifting a portion of a load, a wheeled assembly including a wheel means, a rigid support frame having a transverse element, a connecting means for pivotal engagement with the load at a point distant from said transverse element, an arm upstanding above the connecting means, means for maintaining said point in a laterally stationary position while moving vertically, and means connected to said arm for varying the angular orientation of said assembly about a transverse axis whereby in a raising action the wheel means moves away from the load and in a lowering action the wheel means moves towards the load.

13. A device for lifting a load comprising
(a) a pair of opposed wheel assemblies, each wheel assembly having
   (1) a rigid support frame including
     (a) a transverse axle
     (b) laterally extending arm means pivotally connected to an opposed side of the load
     (c) upstanding arm means
   (2) wheel means mounted on said rigid support frame
(b) means connecting the laterally extending arm means of the opposed wheel assemblies adjacent the pivotal connections at the opposed sides of the load to maintain a substantially fixed distance therebetween,
(c) a hydraulic means connected between the upstanding arm means of the opposed wheel assemblies whereby extension and contraction of the hydraulic means pivots the wheel assemblies about a transverse axis defined by the transverse axle to effect raising and lowering of the load.

References Cited

UNITED STATES PATENTS 3,189,363   6/1965   Pierrat  --------------  280—35

GERALD M. FORLENZA, *Primary Examiner.*

A. J. MAKAY, *Assistant Examiner.*